July 8, 1941.  H. SMALL  2,248,646
PHOTOGRAPHIC FILM TENSIONING MECHANISM
Filed Oct. 27, 1938  4 Sheets-Sheet 1
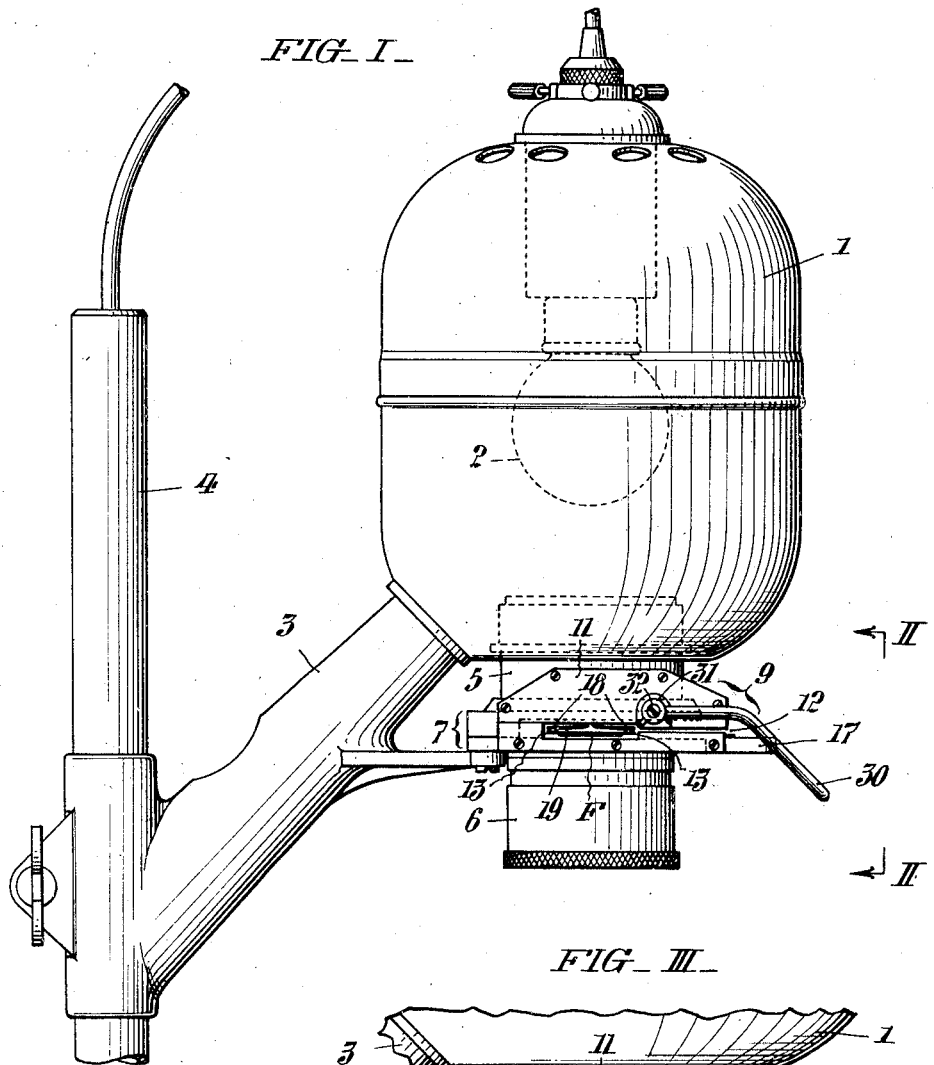
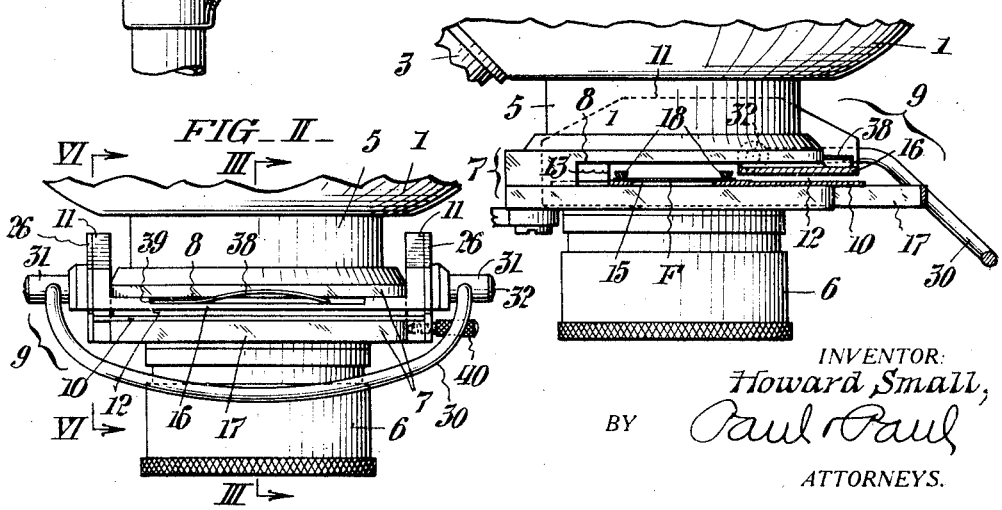
INVENTOR:
Howard Small,
BY Paul & Paul
ATTORNEYS.

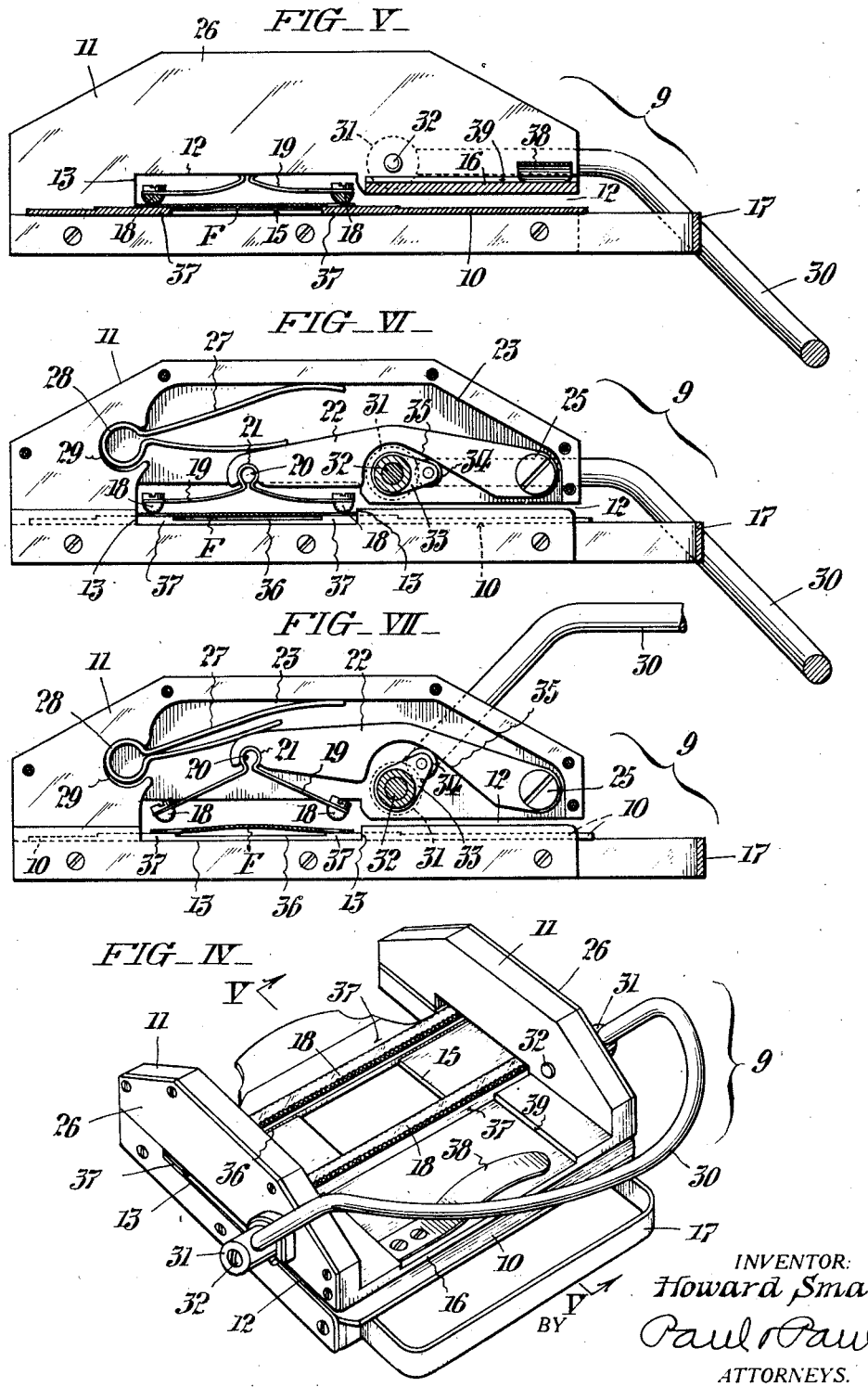

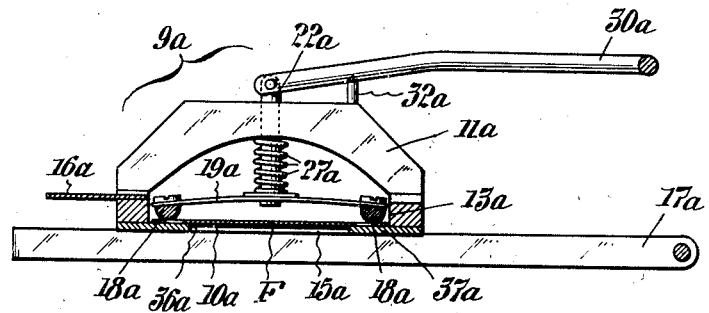
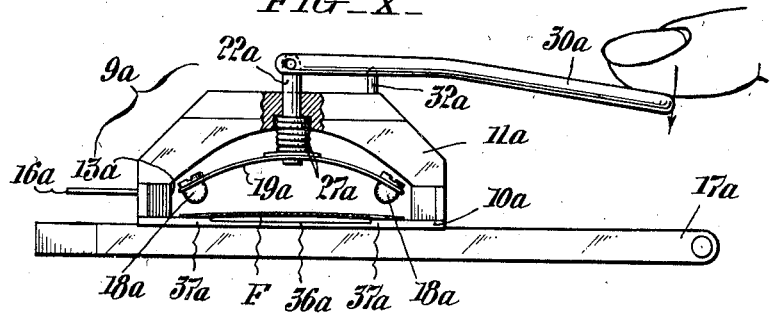
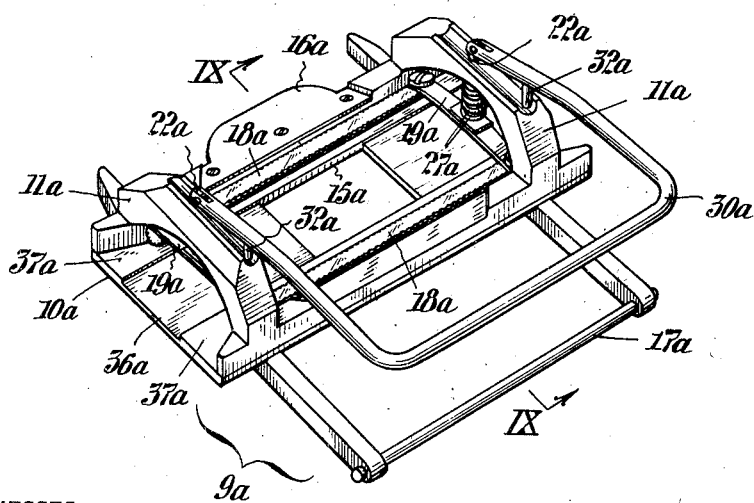

July 8, 1941.  H. SMALL  2,248,646
PHOTOGRAPHIC FILM TENSIONING MECHANISM
Filed Oct. 27, 1938  4 Sheets-Sheet 4
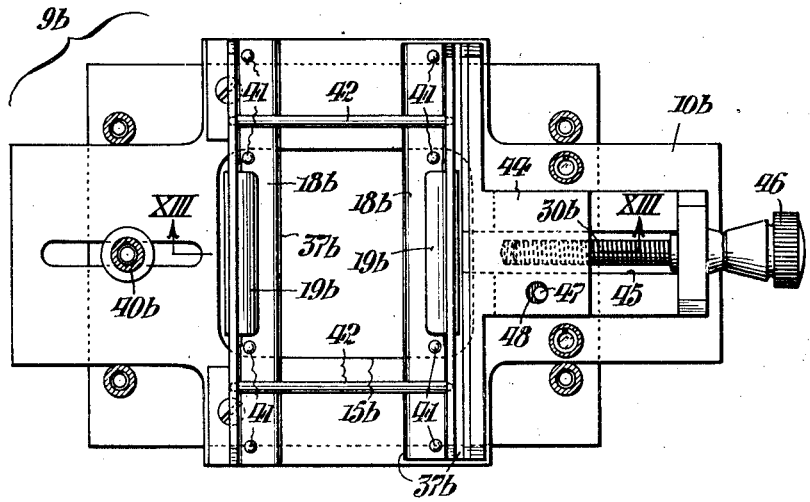
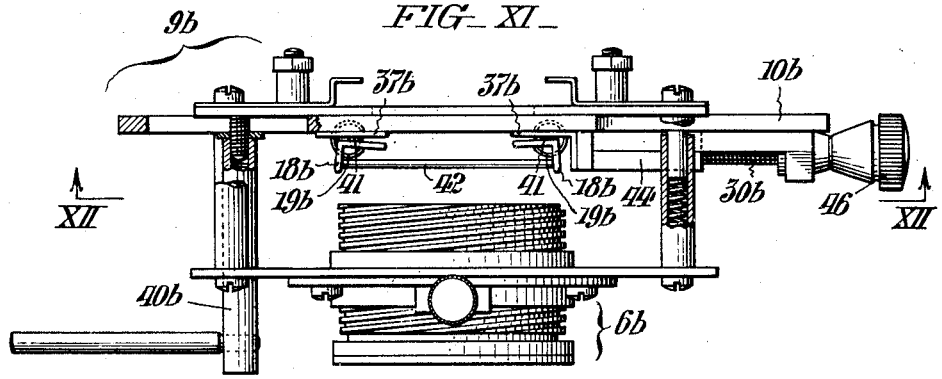
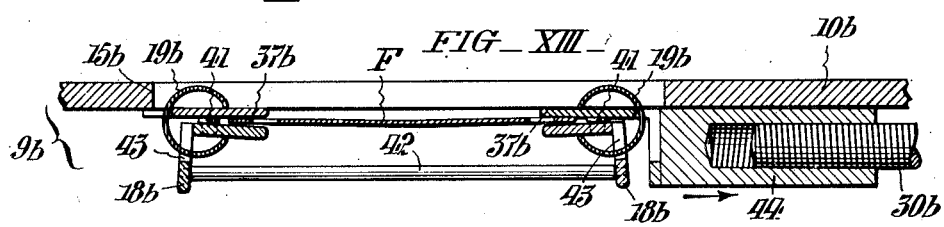
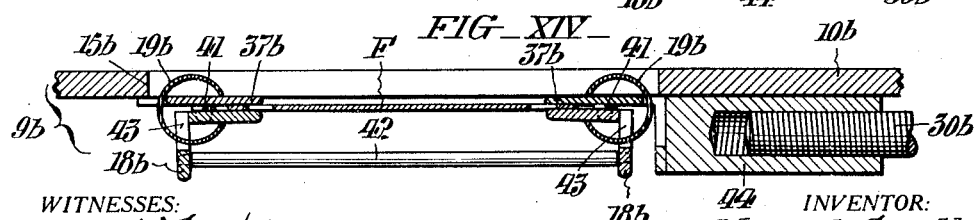
WITNESSES:
Hubert Fuchs
William Bell, Jr.
INVENTOR:
Howard Small,
BY Paul Paul
ATTORNEYS.

Patented July 8, 1941

2,248,646

UNITED STATES PATENT OFFICE 2,248,646

PHOTOGRAPHIC FILM TENSIONING MECHANISM

Howard Small, Philadelphia, Pa.

Application October 27, 1938, Serial No. 237,166

16 Claims. (Cl. 88—24)

This invention relates to means useful in connection with apparatus such as cameras, projectors, projection printers, etc., to hold photographic film under tension, and also to methods of tensioning photographic film.

Owing to differential expansion and contraction of its opposite faces under varying conditions of temperature and humidity, photographic film tends to curl or belly with the result that photographs taken with it or projected from it either onto a screen or photographic paper are distorted or blurred. In the projection of curled or bellied photographic film the distortion or blurring is correspondingly magnified and hence rendered all the more conspicuous. Attempts have been made heretofore to avoid such irregularities by confining the film in a narrow interval between a backing surface and a glass plate. By this method, however, it was impossible to avoid "Newton ring" effects due to reflection between the surfaces of the film and the glass over non-contacting areas, as well as to preclude pin holes due to attraction and retainment by the glass of dust and dirt.

The chief aim of my invention is to obviate the above mentioned drawbacks. This objective I attain in practice, as hereinafter more fully disclosed, through provision of simple, inexpensive and easily operable mechanism by which the photographic film is clampingly engaged only at opposite edges and stretched taut in a free span across the exposure opening of the photographing or projecting apparatus.

Other objects and attendant advantages will appear from the following detailed description of the attached drawings, wherein—

Fig. I is a fragmentary view in side elevation of a photographic apparatus in the form of a projection printer whereof the removable slide for guiding the ribbon film embodies the film tensioning mechanism of my invention.

Fig. II is a fragmentary detail view on a larger scale looking toward the front of the apparatus as indicated by the arrows II—II in Fig. I.

Fig. III is a fragmentary view generally like Fig. I, but with the slide in section, the section being taken as indicated by the arrows III—III in Fig. II.

Fig. IV is a perspective view of the film guiding slide.

Fig. V is a longitudinal sectional view of the slide taken as indicated by the arrows V—V in Fig. IV.

Fig. VI is a section through the slide taken as indicated by the arrows VI—VI in Fig. II, showing the movable parts within the hollow of one of its sides.

Fig. VII is a view like Fig. VI with the movable parts differently positioned.

Fig. VIII is a perspective view of another type slide embodying an alternative form of my invention.

Fig. IX is a longitudinal sectional view of the slide taken as indicated by the arrows IX—IX in Fig. VIII.

Fig. X shows the slide in side elevation with the film tensioning mechanism withdrawn from contact with the film.

Fig. XI shows a side view of another type of slide embodying another alternative construction of my improved film tensioning mechanism.

Fig. XII is a plan sectional view of the slide of Fig. XI taken as indicated by the arrows XII—XII in Fig. XI.

Fig. XIII is a fragmentary detail sectional view on a larger scale taken as indicated by the arrows XIII—XIII in Fig. XII; and Fig. XIV is a view like Fig. XIII with the parts differently positioned.

The projection printer shown in Fig. I for convenience of exemplifying my invention is of well known construction, comprises a housing 1 which encloses an incandescent electric bulb 2, said housing being attached to an arm 3 capable of adjustment on a supporting column 4. Axially aligned with the bulb 2 is a tube 5 which connects into the housing 1 at the bottom, and with the lower end of which a removable enlarging lens holder 6 is telescopically engaged. As shown in dotted lines, the tube 5 extends upwardly into the housing 1 and in its top contains a suitable condensing lens, not illustrated. In the interval between the lenses exteriorly of the housing 1, the tube 5 has a collar 7 of square configuration with a transverse slot 8 which, see Fig. II, is accessible from the front for reception of the ribbon film guiding slide 9 of the apparatus with which slide my improved film tensioning mechanism is incorporated as presently explained. As shown, the slide 9 has a bottom plate 10 to the opposite side edges of which are secured vertical side members 11, the latter being horizontally slotted immediately above said plate as at 12 to enable insertion of the ribbon film designated F from the front of the slide. The side members 11, it will be observed, are recessed downwardly as at 13 to guide the opposite side edges of the film F incident to being shifted across an exposure opening 15 (Fig. IV) in the plate 10. Extending crosswise between the overhanging portions of the side members 11 forwardly of the film guiding recesses 13 is an upper plate 16 which is parallel with the plate 10, the vertical spacing of the two plates being such that they will respectively engage the top and bottom surfaces of the transverse slot 8 in the collar 7 of the lens tube 5 as shown in Fig. II, and thus prevent up and down play of the slide. Centralization of the slide 9 laterally of the tube 5 is assured through engagement of the upwardly and downwardly projecting portions of the side members 11 with the corresponding sides of the collar 7, also as shown in Fig. II. At the front the slide 9 is provided with a grasp bar 17 for convenience of controlling it incident to placement and removal.

The means which I have devised for tensioning the film F so as to be stretched in a free span across the exposure opening 15 in the slide 9, comprises a pair of grippers, which, in the present instances, are in the form of bars 18 of semi-circular cross section, said bars being of a length equal substantially to the crosswise dimension of the slide and adapted to engage the film from above near its longitudinal edges as shown in Figs. V—VII. Preferably the rounded surfaces of the gripper bars 18 are serrated or otherwise roughened so as to more effectively grip the film. At opposite sides of the slide 9, the gripper bars 18 are connected, as instanced in Figs. V to VII, to the ends of transversely-arranged upwardly-arched bow springs 19. Each such spring 19 is fashioned with an eye 20 at the center for engagement within a correspondingly configured notch 21 at the swinging end of a horizontal lever 22. As shown, the lever 22 is disposed within a lateral recess or hollow 23 in the outer face of the corresponding side member 11 and fulcrumed on a screw stud 25, said recess or hollow being closed by a removable cover plate 26. Also, within the hollow of each side member 11 is a horizontally-arranged hairpin spring 27 whereof the rounded head 28 is lodged with an offset 29 at one end of said hollow. The hairpin spring 27, it is to be understood, is considerably stronger than the bow spring 19, and as shown, one of its exteremities bears against the top wall of the hollow 23 in the side member 11, while its other extremity bears down upon the lever 22. The means provided for actuating gripper bars 18 includes a bail 30 whereof the ends terminate in bosses 31 fitted with studs 32 that project inwardly through bearing openings in the side members 11 of the slide 9. Within the hollow 23 of the corresponding side member 11, each stud 32 carries a latch member in the form of a crank arm 33 with a roller 34 to coact with a cam notch 35 in the bottom edge of the lever. With the bail 30 raised and the rocker latch arms 33 in dead center position in respect to the cam notches 35 in the levers 22 as instanced in Fig. VII, said levers are held in raised position in opposition to the hairpin springs 27 with the arched or body springs 19 completely relaxed and supporting the gripper bars 18 clear of the film F, so that the latter may be inserted into and shifted in the slide. Upon swinging the bail 30 down to the position shown in Figs. V and VI, the hairpin springs 27 are permitted to exert their force downwardly upon the levers 22 with the result that the grippers 18 are first brought into contact with the film and thereafter urged outwardly relative to each other as the body spring 19 flattens, to laterally tension the film. In this way, it will be seen that the film will be held perfectly taut across the exposure opening. In order to preclude scratching of the picture bearing area of the emulsion face (lower face in the illustrations) of the film, I have recessed the bottom plate 10 of the slide as shown at 36 in Figs. IV, VI, and VII, leaving but narrow supporting margins 37 at opposite sides of the exposure opening 15 for reaction with said grippers. As shown in Figs. IV—VII, the bail 30 is curved and bent downwardly so as to clear the lamp housing when swung upwardly.

A leaf spring tongue 38 secured at one end in a recess 39 (Fig. IV) in the top of the upper plate 16 of the slide, functions as a stop in connection with the front edge of the collar 7 on the lens tube 5, see Fig. III, to limit the inward movement of said slide and thereby determine exact registry of the exposure opening 15 fore and aft, with said tube. However, by depressing the spring tongue 38 below the top of the slot 8 in the collar 7 it is possible to move the slide 9 further inward if desired or required for convenience of centralizing portions of the film surface near the outer edge thereof in respect to the enlarging lens. The spring tongue 38 does not, of course, interfere with outward shifting of the slide in the slot 8 of the collar 7 so that portions of the film near the opposite or inner edge thereof may be centralized relative to the enlarging lens. A set screw shown at 40 in Fig. II threaded into one of the side members 11 of the slide and adapted to engage the corresponding side of the collar 7, is relied upon to secure the slide in adjusted positions.

In the alternative form of my invention shown in Figs. VIII-X the bow springs 19a carrying the grippers 18a are secured at their center to vertical rods 22a which are confined to endwise movement in the side members 11a of the slide 9a. Surrounding each of the rods 22a in the interval between the spring 19a and the arched portions of the side members 11a of the slide is a stronger compression spring 27a. The outer end of each rod 22a is pivotally connected to the inner end of one of the extremities of an actuating bail 30a which is fulcrumed on pivot studs 32a upstanding from the side members 11a of the slide. The normal position of the parts is as shown in Fig. IX with the bow springs 19a forced down and flattened by the stronger springs 27a and with the grippers 18a bearing down upon the film F to tension it as in Fig. IX. Withdrawal of the grippers 18a is effected by downward pressure upon the bail 30a as a result of which the springs 27a are contracted as in Fig. X, with attendant relaxation of the bow springs 19a and withdrawal of the grippers 18a from the film. All other elements not specifically mentioned in connection with the alternative embodiment of Figs. VIII-X but having their counterparts in the first described embodiment have been identified with the same reference numerals previously used to which the letter "a" has been added in each instance for convenience of distinction.

In the alternative embodiment of my invention shown in Figs. XI-XIV, the grippers 18b are in the form of angle bars of which the horizontal flanges face each other edgewise; and which are pivoted to rock upon their corners about studs 41 projecting from the ledges 37b on the plate 10b. Extending between the grippers 18b are shouldered spacer rods 42 whereof the diametrically reduced ends loosely engage apertures in the vertical flanges of the grippers.

The grippers 18b are held in the assembly by means of spring clips 19b which extend through central openings 43 in said grippers, one edge of the spring bearing in each instance on the horizontal flange of the gripper and the other edge bearing upon the corresponding ledge member 37b. The ledge 37b at the left hand side of the illustration is separately formed and affixed to the plate 10b, while the right hand ledge 37b is attached to a slide 44 confined in a guideway 45 in said plate, see Fig. XII. The parts are shown in their normal positions in Figs. XII and XIII with the grippers 18b tilted outwardly on the pivot studs 41 so that the film F can be inserted between the horizontal flanges of said grippers and the ledge members 37b as shown in Fig. XIII. After placement of the film as just explained, the slide 44 is moved outward from the position of Fig. XIII to the position of Fig. XIV by means of an adjusting screw 30b having a finger knob 46, with attendant release of the springs 19b whereby the grippers 18b are first swung inwardly about their pivots 41 into clamping relation with the ledges 37b. Upon continued outward movement of the slide 44 lateral tension will be induced in the film due to movement of the gripper 18b at the right hand side of the illustration away from the gripper at the left hand side. A pin shown at 47 in Fig. XII coacts with a hole 48 in the slide 44 to limit the movement of the latter. Here again the same reference numerals have been employed to designate elements not specifically referred to having their counterparts in the previously described embodiments, except for use of the letter "b" in each of them for the purposes of ready distinction.

My invention is not to be regarded as limited to stretching film in but one direction, since by mere duplication of parts within the scope of the appended claims it may be adapted, as may be desirable, in connection with cut or individual picture film, to stretch it at right angles as well; nor is it to be regarded as limited to use in projector printers since by suitable modification also within the scope of the appended claims it may be adapted to cameras, and photographic picture projectors.

Having thus described my invention, I claim:

1. Photographic film tensioning mechanism comprising gripping elements with crosswise serrated gripping areas for biting into opposite edge margins of the film while the latter over-lies an exposure opening in a backing surface; and means for moving said elements outward relative to each other while in pressure contact with the film margins on the backing surface to tension the film.

2. Photographic film tensioning mechanism comprising gripping elements with crosswise serrated gripping areas for biting into opposite edge margins of the film while the latter over-lies an exposure opening in a backing surface; means for normally supporting the gripping elements clear of the backing surface; and means for bringing the gripping elements into pressure contact with the film margins on the backing surface and then moving them outward relative to each other to tension the film.

3. Photographic film tensioning mechanisms comprising gripping elements with crosswise serrated gripping areas for biting into opposite edge margins of the film while the latter over-lies the exposure opening in a backing surface; a bow spring to the ends of which the gripping elements are secured, and means for flattening the bow spring thereby to cause outward movement of the gripping elements relative to each other while in pressure contact with the film margins on the backing surface.

4. Photographic film tensioning mechanism comprising elements with gripping surfaces for engaging edge margins of film overlying an exposure surface in a backing surface; spring means operative upon being compressed to cause outward movement of the elements in gripping contact with the film margins on the backing surface; a stronger spring means operative upon the first spring means for the purpose aforesaid; and means for moving the grippers in opposition to the stronger spring means, to release the film.

5. Photographic film tensioning mechanism comprising a bow spring with gripping surfaces at its opposite ends for engaging edge margins of film overlying an exposure opening in a backing surface; a stronger spring adapted to flatten the bow spring thereby to cause relative outward movement of the gripping surfaces in gripping pressure contact with the film margins on the backing surface to tension the film; and means for moving the bow spring in opposition to the stronger spring to release the film.

6. Photographic film tensioning mechanism comprising elements with gripping surfaces for engaging edge margins of film overlying an exposure opening in a backing surface; a bow spring to the ends of which the elements are secured; a stronger spring adapted to flatten the bow spring thereby to cause relative outward movement of the elements in gripping pressure contact with the film margins on the backing surface to tension the film; and means for moving the grippers in opposition to the stronger spring.

7. Photographic film tensioning mechanism comprising grippers for engaging edge margins of film overlying an exposure opening in a backing surface; a bow spring to the ends of which the grippers are secured; a lever to the swinging end of which the spring is attached at the center; a stronger spring bearing on said lever and operative to flatten the bow spring and thereby cause relative outward movement of the grippers in pressure contact with the film margins on the backing surface to tension the film; and means for actuating the lever to contract said stronger spring to relax and thereby effect withdrawal of the grippers from the film.

8. Photographic film tensioning mechanism comprising grippers for engaging edge margins of film overlying an exposure opening in a backing surface; a bow spring to the ends of which the grippers are secured; a lever to the swinging end of which the spring is attached at the center; a stronger spring bearing on said lever and operative to flatten the bow spring and thereby cause relative outward movement of the grippers in pressure contact with the film margins on the backing surface to tension the film; a latch member associated with the lever; and means for actuating the latch member to move the lever so that the stronger spring is contracted to withdraw the grippers from the film and said lever locked in the position to which it is moved.

9. Photographic film tensioning mechanism comprising grippers for engaging edge margins of film overlying an exposure opening in a backing surface; a bow spring to the ends of which the grippers are secured; a rod to one end of which the bow spring is connected at the center;

a fixed guide confining the rod to endwise movement; a stronger spring in compression between the bow spring and the guide and operative to flatten said bow spring and thereby cause relative outward movement of the grippers in pressure contact with the film margins on the backing surface to tension the film; and actuating means for moving the rod in opposition to the stronger spring to permit the bow spring to relax and thereby withdraw the grippers from contact with the film.

10. Photographic film tensioning mechanism comprising clamp grippers for engaging edge margins of film overlying an exposure opening in a backing surface; springs tending to move the grippers to closed position; means operative to normally oppose the springs with the grippers in open position; and actuating means for counteracting the influence of the spring-opposing means to allow the springs to relax and thereby move the grippers outward relative to each other to tension the film.

11. Photographic film tensioning mechanism comprising a pair of clamp grippers for engaging edge margins of film overlying an exposure opening in a backing surface, said grippers having the form of angle bars arranged with the edges of their clamp flanges facing each other; means whereby the grippers are pivotally connected at their corner angles to the backing surface; springs tending to swing the grippers to closed position; a shouldered spacer rod with reduced end portions loosely engaging openings in the perpendicular flanges of the grippers; a slide movable in parallel relation to the backing surface and carrying one of the grippers; and means for actuating the slide to move the gripper thereon outward relative to the other gripper, and thereby permit closing of said grippers by the springs and to place the film in tension.

12. The combination with a removable photographic ribbon film guiding slide adapted for insertion into an opening in the interval between the light source and the lens of a photographic projection apparatus, means for tensioning the film to lie flat over the exposure opening in the slide, comprising gripping elements with crosswise serrated gripping areas for biting into opposite edge margins of the film while the latter is supported on the side edge margins of the exposure opening; and means for bringing the gripping elements into pressure contact with the film, and then for moving them outward relative to each other to tension the film.

13. The combination with a removable ribbon film guiding slide of photographic apparatus, of means for laterally tensioning the film to lie flat over the exposure opening in the slide, comprising a pair of normally retracting parallel gripper bars with crosswise serrated gripping areas adapted to bite into opposite longitudinal edge margins of the film while the latter is supported upon the edge margins of the exposure opening; transversely arranged spaced bow springs to the ends of which the gripper bars are secured; and retractable means for applying pressure to the centers of the springs to spread them and thereby cause outward movement of the grippers while in pressure contact with the film to tension the latter.

14. The combination with the removable ribbon film-guiding slide of photographic apparatus, of means for laterally tensioning the film to lie flat over the exposure opening in the slide, comprising a pair of normally retracted parallel gripper bars adapted to engage longitudinal edge margins of the film supported on the side edge margins of the exposure opening; transversely-arranged spaced arched bow springs to the ends of which the gripper bars are secured; arms to the swinging ends of which the leaf springs are secured at the center; stronger springs pressing down on said arms to spread the leaf springs and thereby move the grippers outward relative to each other to tension the film; and means for concurrently raising the arms against the pressure of said stronger springs to permit relaxation of the bow springs and withdrawal of the grippers from the film.

15. The combination with the ribbon film guiding slide of photographic apparatus, of means for laterally tensioning the film to lie flat over the exposure opening in the slide, comprising a pair of normally retracted parallel gripper bars adapted to engage the longitudinal edge margins of the film supported by the side edge margins of the exposure opening; transversely spaced arched bow springs to the ends of which the gripper bars are secured; arms to the ends of which the leaf springs are secured at the center; heavier springs pressing down on said arms; a bail-like actuating member having its ends engaged in opposite sides of the slide; latch members on the ends of the bail extending beneath the levers whereby said levers may be concurrently lifted against the pressure of the stronger springs to permit relaxation of the bow springs and withdrawal of the grippers from the film, and locked in retracted positions.

16. The combination according to claim 12, in which a stop coacts with the lens support to normally limit inward movement of the slide and thereby determine axial registry of the exposure opening with the lens, said stop being depressible into the slide for capacity to clear the slot and so allow said slide to be shifted further inward to bring the axis of its exposure opening beyond that of the lens.

HOWARD SMALL.